(12) United States Patent
Schmidt

(10) Patent No.: US 11,645,704 B2
(45) Date of Patent: May 9, 2023

(54) SYSTEM AND METHODS FOR RAPID DATA TRANSFER AND CHECKOUT

(71) Applicant: Capped Out Media, Taylorsville, UT (US)

(72) Inventor: Waynard Schmidt, West Valley City, UT (US)

(73) Assignee: Capped Out Media, Taylorsville, UT (US)

( * ) Notice: Subject to any disclaimer, the term of this patent is extended or adjusted under 35 U.S.C. 154(b) by 109 days.

(21) Appl. No.: 17/084,950

(22) Filed: Oct. 30, 2020

(65) Prior Publication Data
US 2022/0138837 A1 May 5, 2022

(51) Int. Cl.
| | |
|---|---|
| G06Q 30/06 | (2012.01) |
| G06F 40/35 | (2020.01) |
| G06F 40/56 | (2020.01) |
| G06Q 30/02 | (2023.01) |
| G06N 3/04 | (2023.01) |
| G06Q 30/0601 | (2023.01) |

(52) U.S. Cl.
CPC ......... G06Q 30/0643 (2013.01); G06F 40/35 (2020.01); G06F 40/56 (2020.01); G06N 3/04 (2013.01); G06Q 30/0281 (2013.01); G06Q 30/0631 (2013.01); G06Q 30/0633 (2013.01); G06Q 30/0635 (2013.01); G06Q 30/0641 (2013.01)

(58) Field of Classification Search
CPC ........... G06Q 30/0643; G06Q 30/0631; G06Q 30/0633; G06Q 30/0635; G06Q 30/0641
See application file for complete search history.

(56) References Cited

U.S. PATENT DOCUMENTS 9,961,204 B1 * 5/2018 Moran ............. G06Q 10/06393
11,138,249 B1 * 10/2021 Tosik ...................... G06F 40/30
(Continued)

OTHER PUBLICATIONS

This is how the shopping button in WhatsApp will work Timesofindia.com | Oct. 26, 2020, 05.57 PM IST (Year: 2020).*
(Continued)

*Primary Examiner* — Michael Misiaszek
(74) *Attorney, Agent, or Firm* — Bochner IP, PLLC; Andrew D. Bochner

(57) ABSTRACT

A transactional chat platform including a customer sub-system and customer interface, a client sub-system and client interface, and a server sub-system and database is provided. The sub-systems may be configured to transmit data between the customer sub-system and the client sub-system, between the client sub-system and the server sub-system, and between the customer sub-system and the server sub-system. The client sub-system may be configured to initiate a transaction in response to customer communications via the chat box by identifying products from the product list based on keywords used by the customer and displaying those products as thumbnails in the chat box, receiving confirmation from the customer that the customer desires the products, and displaying a purchase prompt embedded interface entirely within graphical boundaries of the chat box, the purchase prompt embedded interface comprising billing and mailing address fields to be completed by the customer.

17 Claims, 9 Drawing Sheets

(56) References Cited

U.S. PATENT DOCUMENTS

| | | | | |
|---|---|---|---|---|
| 2018/0007204 A1* | 1/2018 | Klein | ................. | H04M 3/5166 |
| 2018/0081989 A1* | 3/2018 | Nakao | ................. | G06F 16/9535 |
| 2019/0020615 A1* | 1/2019 | Golden | .............. | H04L 65/1069 |
| 2019/0095048 A1* | 3/2019 | Schmidt | ................. | G06F 9/451 |
| 2019/0236466 A1* | 8/2019 | Harrison | ................ | G06N 5/043 |
| 2021/0201238 A1* | 7/2021 | Sekar | ..................... | G06Q 10/00 |
| 2021/0201380 A1* | 7/2021 | Belcher | ............. | G06Q 30/0641 |
| 2021/0297461 A1* | 9/2021 | Athwal | ................ | G06Q 20/127 |

OTHER PUBLICATIONS

Mobilepaymentstoday.com: Can facebook and twitter accelerate retail m-commerce markets? (2015). . Chatham: Newstex. Retrieved from https://dialog.proquest.eom/professional/docview/1680771033?accountid=131444 (Year: 2015).*

* cited by examiner

SYSTEM AND METHODS FOR RAPID DATA TRANSFER AND CHECKOUT

BACKGROUND

The present invention relates to the field of web-based software. More particularly, the present invention is directed toward facilitating e-commerce data transfers and transactions utilizing a chat system.

Transaction systems have migrated to electronic networks, and are the backbone of e-commerce interactions. Over the internet, customers are able to purchase various items and services, such as products, software, entertainment and the like. Products and services may be purchased from large merchants, medium sized merchants or even individuals.

Transactions can occur directly between the merchant and purchaser, or the purchaser may be directed to an intermediate or third-party payment site to submit payment. As e-commerce becomes more prevalent, consumers are spending less time in brick and mortar establishments. While e-commerce has numerous benefits, including cost, availability, convenience and more, it lacks the ability to perceive or interact with items and various services directly. For example, instead of checking a clothing rack in a physical location for a shirt, an e-commerce purchaser may instead need assistance to determine what size actually fits their body type without trying on.

Thus, along with the development of online commerce, customer service has evolved as well. Virtual chats are used to engage customers, whether via a "bot" (e.g., a non-human initiated chat, such as software that says "hello" when a webpage is visited), or via a human. As e-commerce has continued to develop, so have the capabilities of online embedded chats.

However, such customer services chats often distract would-be purchasers from executing the purchase itself, resulting in a lower conversion rate. For example, while looking at an item to purchase, a consumer may have a question, forcing them to turn to the chat widget for assistance. In doing so, the consumer would then be forced to return to the item page and purchase the item, while also ensuring that information determined via the chat session is properly reflected and transferred to the actual purchased item.

Increased conversion rates in e-commerce are shown where speed and ease of the shopping experience are at their maximum. In particular, a seamless and streamlined checkout experience has been shown to increase purchase yield.

It would be desirable, therefore, to provide a dynamic chat widget that, upon receiving questions or transmitting information, may increase conversion rates, or eliminate conversion loss due to the purchase sequence interruption.

It would be further desirable to provide systems and methods for doing so by providing a chat widget that can process the transaction and/or payment via the embedded chat, without the need to return to the item screen and process.

It would be yet further desirable to provide a system for retrieving and associating product information within the chat, allowing checkout directly therein.

It would be further desirable to provide systems and methods for increasing conversion yield by dynamically accepting payment and processing a purchase.

Accordingly, systems and methods for syncing data via a chat widget are hereby provided.

SUMMARY OF THE INVENTION

The transactional chat platform features a customer sub-system and interface, a client sub-system and interface, and a server sub-system and database. The customer sub-system primarily receives, formats, and categorizes customer requests for product information, which are obtained through the customer interface. As used herein, "customer" is a user who interacts with a client's website in order to browse and purchase products, while "client" has a subscription-based relationship with the transactional chat platform, which the client uses in order to facilitate customer purchases.

The client sub-system enables the client to create and modify chat widgets via the client interface. Creation of a chat widget occurs through the generation of an embedded widget code, which is embedded in the client's website via HTML. Modifications include aesthetic choices, such as the application of color on the chat box.

The client sub-system is configured to permit an operator, to communicate with customers via the chat box, and in particular, to transmit product "thumbnails" as well as purchase prompts, which are displayed and engaged with entirely within the chat box itself. Multiple customers can be communicated with at once by a single operator, who can manage customer communications via the client sub-system interface via communication categories, such as "active", "pending", and "completed".

Figure 1:
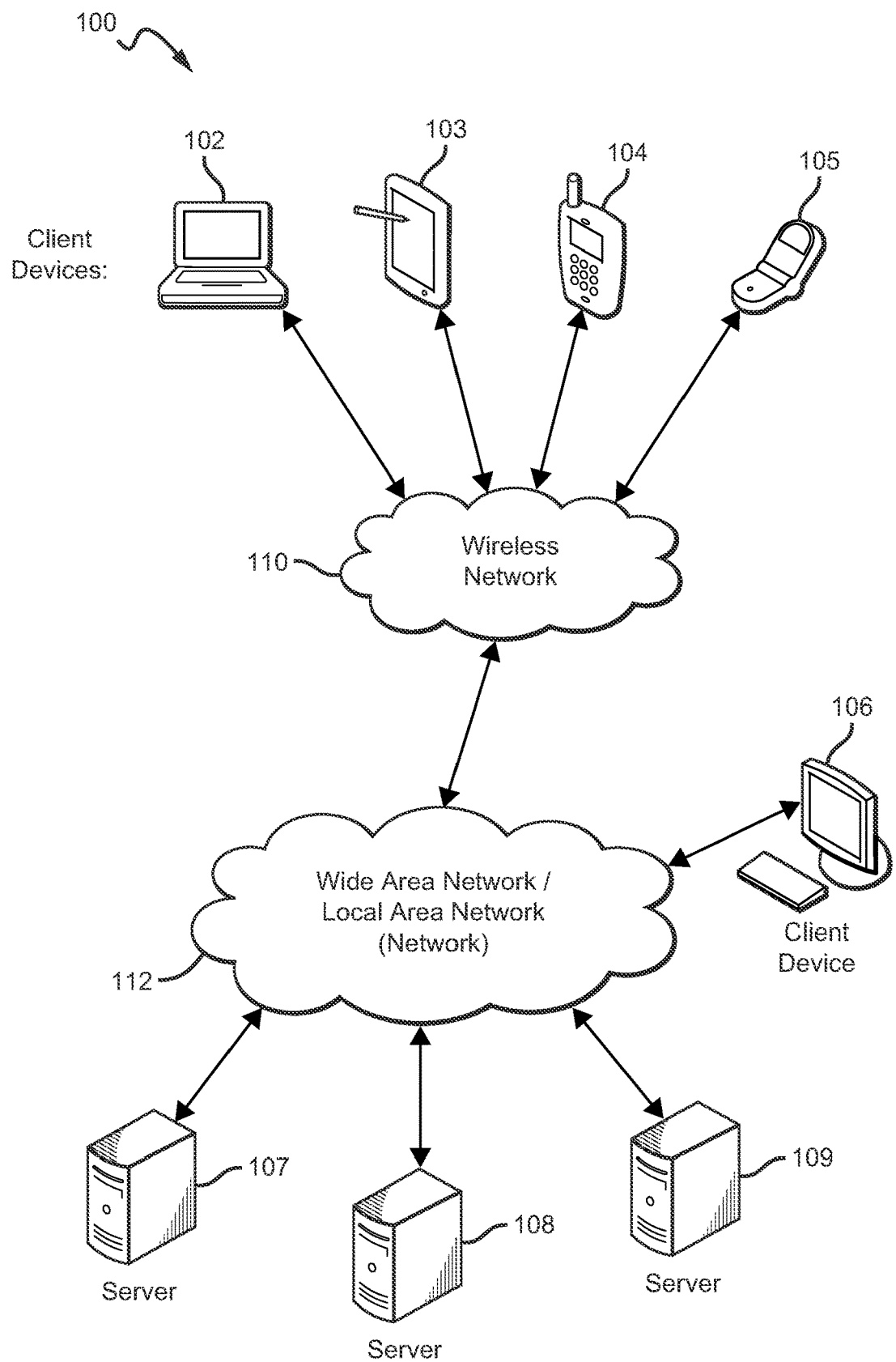
FIG. 1 shows an exemplary system architecture of the computers operating the transactional chat platform.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION OF THE INVENTION

The detailed description provided herein, along with accompanying figures, illustrates one or more embodiments, but is not intended to describe all possible embodiments. The detailed description provides exemplary systems and methods of technologies, but is not meant to be limiting, and similar or equivalent technologies, systems, and/or methods may be realized according to other examples as well.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" as used herein typically includes and refers to executable instructions, code, data, applications, programs, program modules, or the like maintained in an electronic device such as a ROM. The term "software" as used herein typically includes and refers to computer-executable instructions, code, data, applications, programs, program modules, firmware, and the like maintained in or on any form or type of computer-readable media that is configured for storing computer-executable instructions or the like in a manner that may be accessible to a computing device.

The terms "computer-readable medium", "computer-readable media", and the like as used herein and in the claims are limited to referring strictly to one or more statutory apparatus, article of manufacture, or the like that is not a signal or carrier wave per se. Thus, computer-readable media, as the term is used herein, is intended to be and must be interpreted as statutory subject matter.

The term "computing device" as used herein and in the claims is limited to referring strictly to one or more statutory apparatus, article of manufacture, or the like that is not a signal or carrier wave per se, such as computing device 101 that encompasses client devices, mobile devices, one or more servers, network services such as an Internet services or corporate network services based on one or more computers, and the like, and/or any combination thereof. Thus, a computing device, as the term is used herein, is also intended to be and must be interpreted as statutory subject matter.

FIG. 1 is an illustrative block diagram of system 100 based on a computer 101. The computer 101 may have a processor 103 for controlling the operation of the device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be devices including various other components, such as a battery, speaker, and antennas (not shown).

Terminal 151 and/or terminal 141 may be portable devices such as a laptop, cell phone, smartphone, smartwatch, or any other suitable device for storing, transmitting and/or transporting relevant information. Terminals 151 and/or terminal 141 may be other devices. These devices may be identical to system 100 or different. The differences may be related to hardware components and/or software components.

Figure 2:
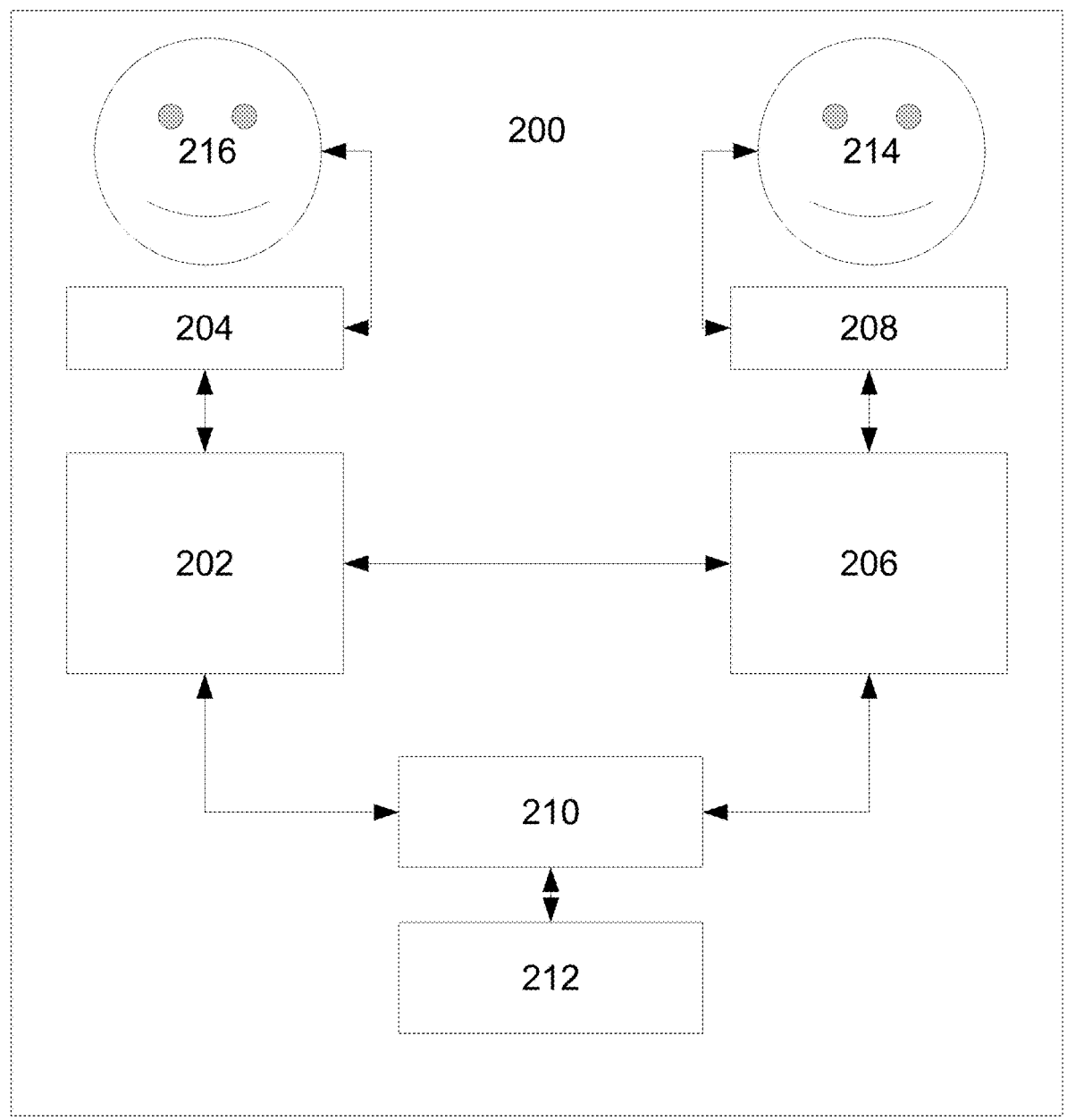
FIG. 2 shows an exemplary system architecture of the transactional chat platform.

As shown in FIG. 2 the transactional chat platform 200 comprises a customer sub-system 202 and interface 204, a client sub-system 206 and interface 208, and a server sub-system 210 and database 212. Data is relayed from the customer sub-system to the client sub-system and vice versa, either directly, or via the server sub-system. The client sub-system is configured to handle requests from and be operated by business clients 214, particularly e-commerce merchants. The customer sub-system is configured to address the needs of customers 216 visiting the websites of e-commerce merchants' websites, particularly to enable the merchants to respond to customer requests for information about products and to facilitate transactions.

Figure 3A:
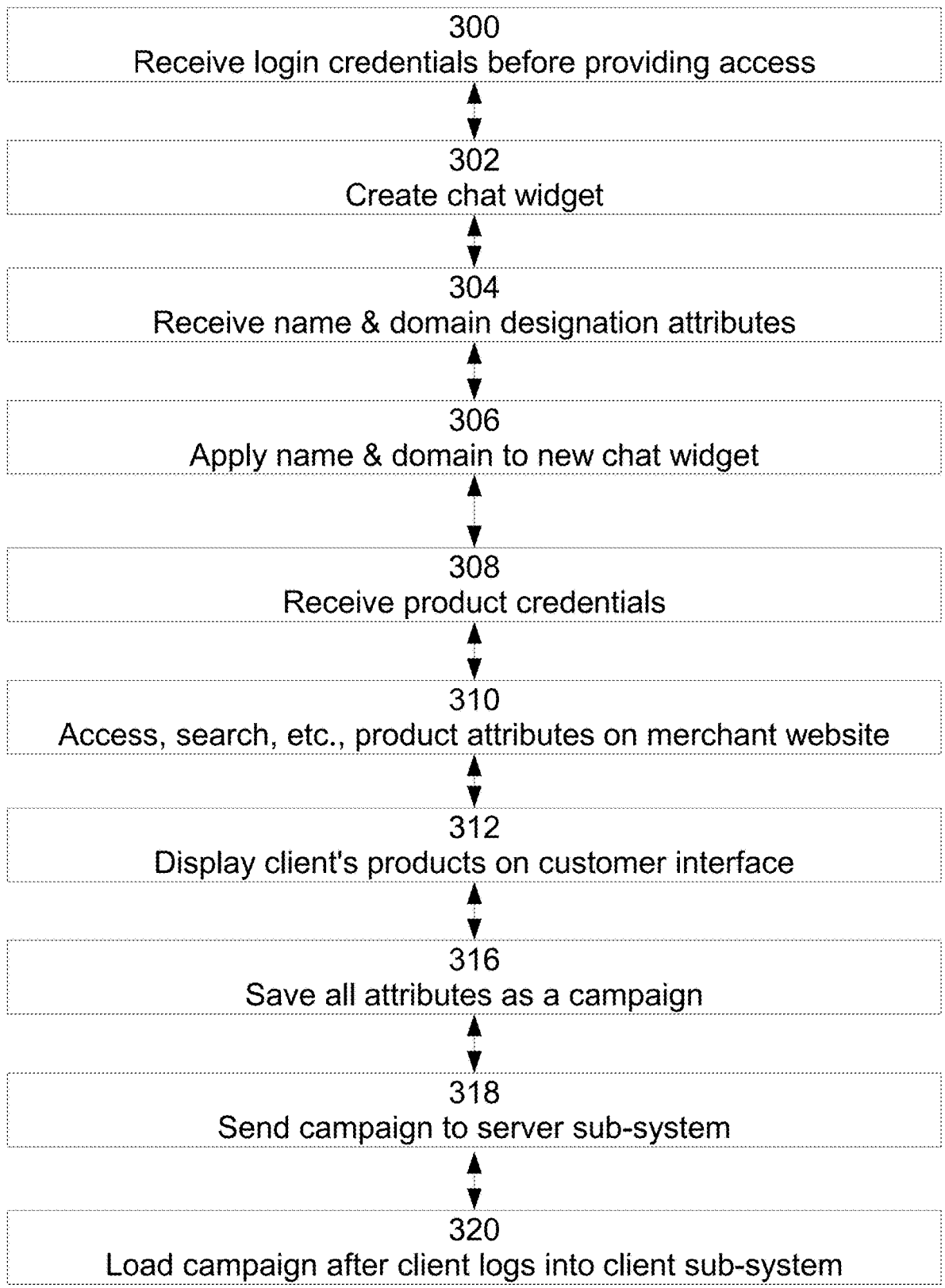
FIG. 3a shows an exemplary process of creating and customizing a chat widget.

As shown in FIG. 3a, the client sub-system receives user login credentials 300 to provide a user secure operational access to the transactional chat platform. Within a given subscription plan, the platform offers multiple account types so that a supervisor can oversee the communications of the operators and monitor the AI, as will be described later. Operations available to the user include, among other things, the creation of a chat widget 302. The client sub-system can receive a name designation attribute and a domain designation attribute from the user 304, which is then applied or adapted to a new or existing chat widget 306. The name designation attribute serves as a widget ID to distinguish a given widget from other widgets. The domain designation attribute identifies the target website on which the chat widget will be active and as a preliminary step in loading a product list into the client sub-system.

In one embodiment, a client may request and the client sub-system may generate multiple widgets, which the client may assign to the same or separate domain. If multiple widgets are assigned the same domain, then each widget may be independently customized for a given set of products, as will be discussed below.

The client sub-system receives product credentials from the user 308, enabling the client sub-system to access, search, manipulate, and update the product attributes on the merchant website 310, and display the client's products on the interface between the chat widget and the customer (i.e., a chat box) 312. This feature effectively permits the client to import their products into the transactional chat platform. Product credentials may comprise a code or ID pertaining to the entire client's product list or a sub-set thereof, with the product list being accessed on the client's website through an API. The client sub-system permits multiple product credentials to be activated simultaneously, such that multiple product list sub-sets, which may or may not overlap, may be pulled from a single website, or multiple product lists may be pulled from multiple sites. The name designation and domain designation attributes discussed earlier, the product credentials discussed here, and other customizable aspects of the chat widgets may be saved as a "campaign" 314, transmitted to the server sub-system 316, and loaded after a client user logs back into the client sub-system 318.

An embedded widget code is generated 319 by the client sub-system and displayed to the client, enabling the client to copy the embedded widget code and paste it into their site's HTML code above the "</body>" tag. The chat widget may be actualized by including embedded widget code on the client website 320. Alternatively, the client sub-system may add in the necessary HTML code automatically by engaging with the website's developer API.

Figure 3B:
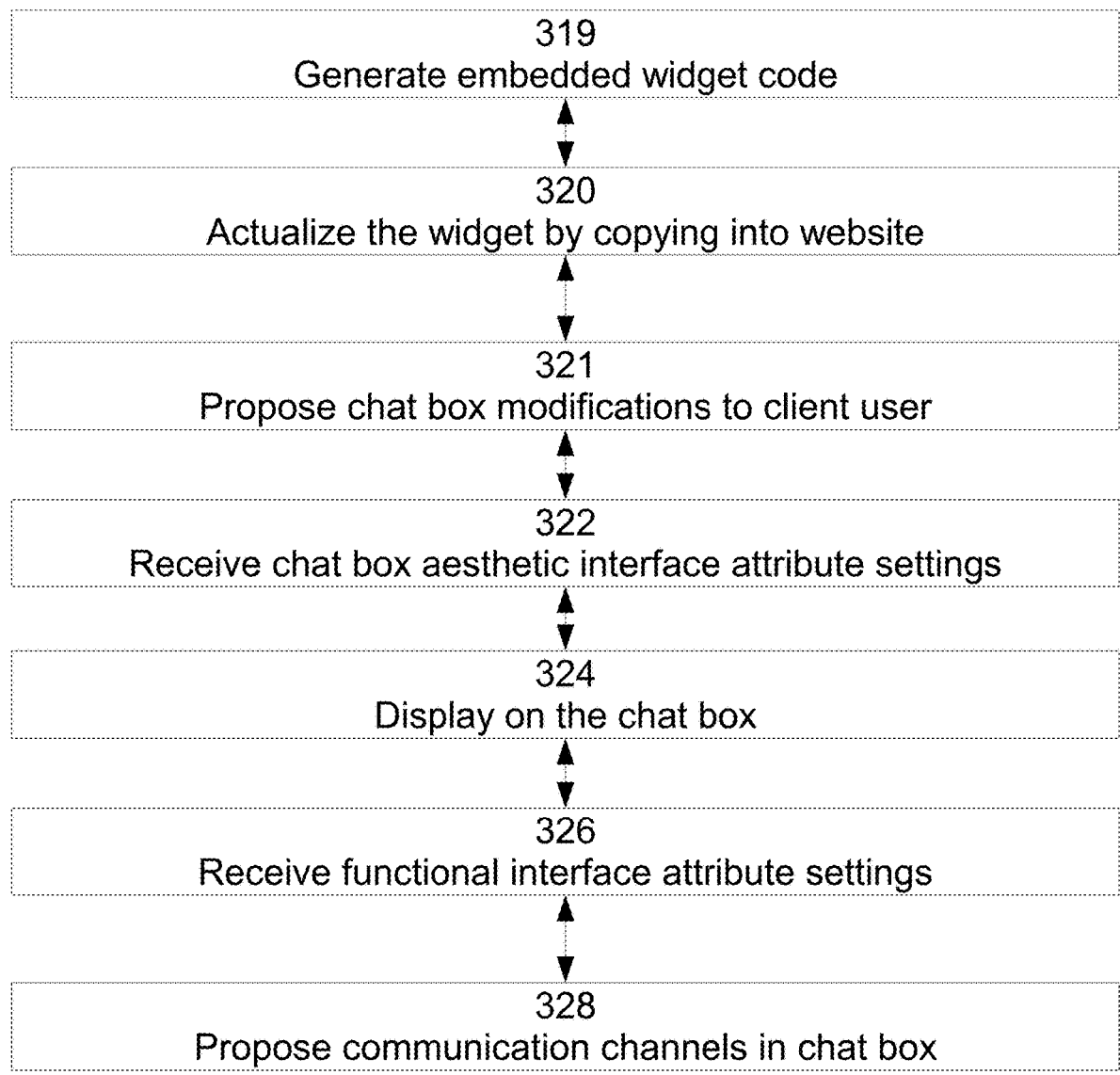
FIG. 3b shows an exemplary process of modifying the chat widget.

Aesthetic interface attribute selection may be proposed to the client via windows displaying color gradients designated for various fields of the chat box, such as a header, main body, font, highlighting, etc. 321. Color modifications may provide for hex editing. As shown in FIG. 3b, the client sub-system may receive chat box aesthetic interface attribute settings 322, such as color, texture, or other aesthetic dimensions, which will then be displayed on the chat box in the customer sub-system for a given chat box associated with the manipulated chat widget 324.

The client sub-system may receive input from the user for various chat box functional interface attributes 326, such as an email address for an email feature, or question and answer fields for a programmatically static but interactive FAQs. The email feature enables the customer sub-system to propose email communications with the customer in addition to or in lieu of live chatting 328.

Figure 3C:
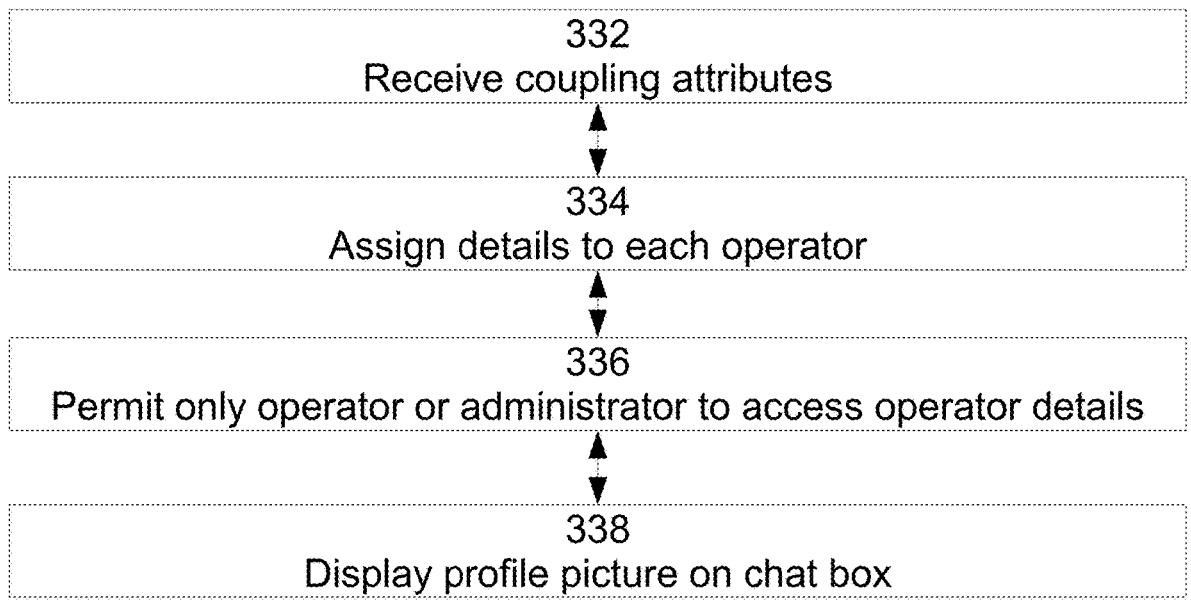
FIG. 3c shows an exemplary process of assigning operators to chat widgets and communications.

As shown in FIG. 3c, the client sub-system may receive coupling attributes, in which a given chat widget is assigned to a given operator, the operator being the "voice" behind the chat box 332. The operator may be a live (human) person, such as an employee of the client, or may be an artificial intelligence program integrated with or interfacing the client sub-system (the "AI Operator"). The operator may be assigned a name, email address, password, and image 334, with the email address and password assigned to an account which only the operator or an administrative user may access 336. The image is configured by the customer sub-system 338 to serve as a "profile picture" for the operator in order to "humanize" the chat box for the benefit of the operator and customer alike.

The client sub-system may limit user access to chat widget features, including the number of chat widgets (the client's "chat widget set"), the number of customers a given chat widget—or the chat widget set—can engage with, the length of recorded chat history for each chat widget, the UI customization of the chat widgets, the customer engagement features for each chat widget, and the transactional options for each chat widget 340, based on the payment plan to which the client has subscribed. Subscription requests may be received by the client sub-system and confirmed by the server sub-system based on billing information received by the client sub-system via the client interface.

Figure 4A:
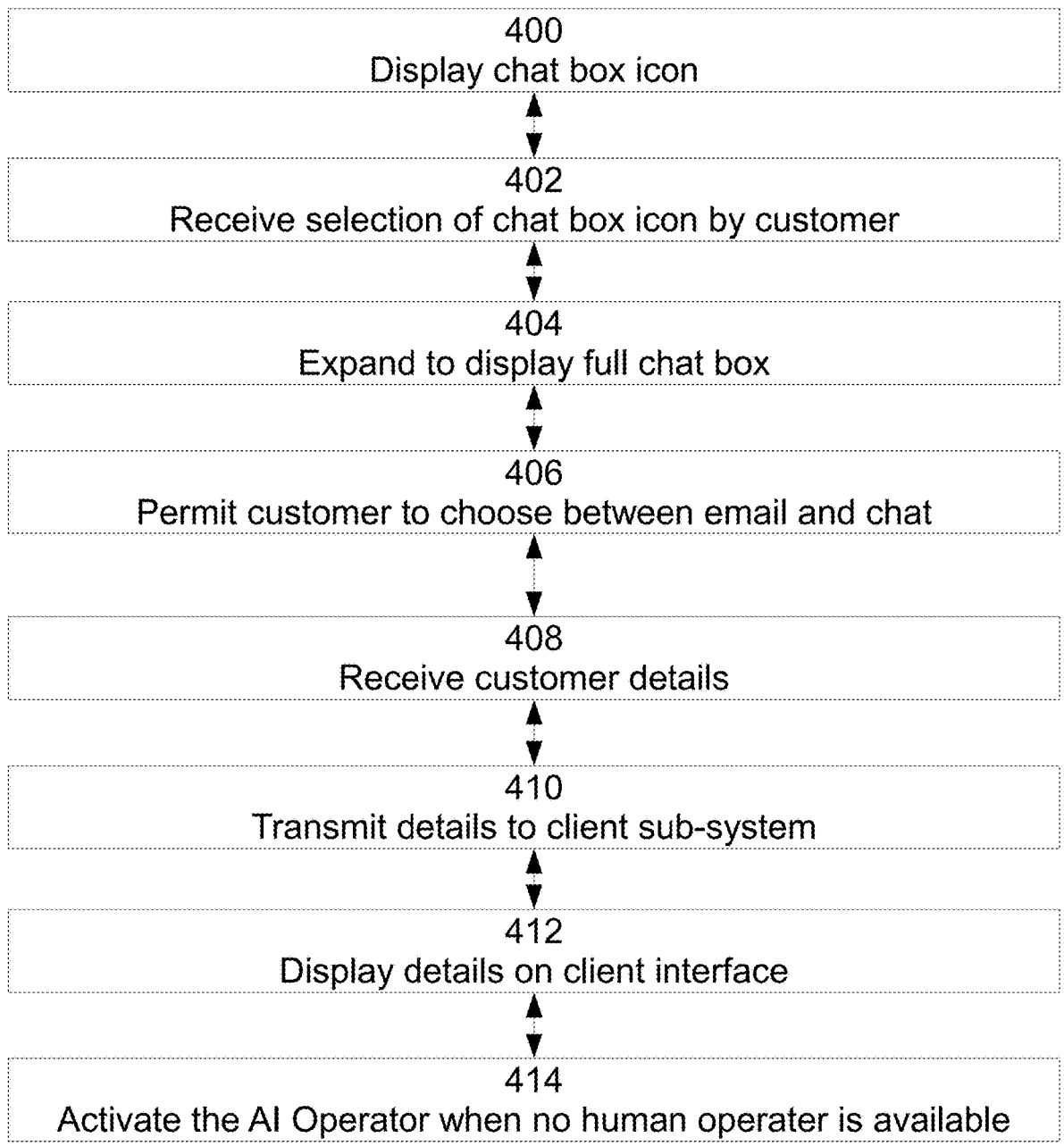
FIG. 4a shows an exemplary interactive process between the customer and the customer sub-system.

As shown in FIG. 4a, the customer sub-system is configured to display a chat box icon on the customer interface 400, which, when selected by a customer 402, expands to display a full chat box 404. This chat box is based on the attributes assigned to the chat widget. The chat box will display interactive interface buttons permitting the customer to choose between sending an email or chatting directly with an operator 406. The operator communication channel may be preselected if an operator is available or active on the client sub-system, in which case, the chat box will display an initial prompt to the customer. Operators may be assigned customers to communicate with based on the number of customers they are already communicating with; more precisely, an operator who is communicating with fewer customers than all other operators will likely be assigned the next customer available. Customers who were previously assigned to a given operator may be reassigned to another operator depending on the progress of the communication. For example, a customer who is posing difficult questions or requesting discounts may be reassigned to a "superior" operator.

Figure 4B:
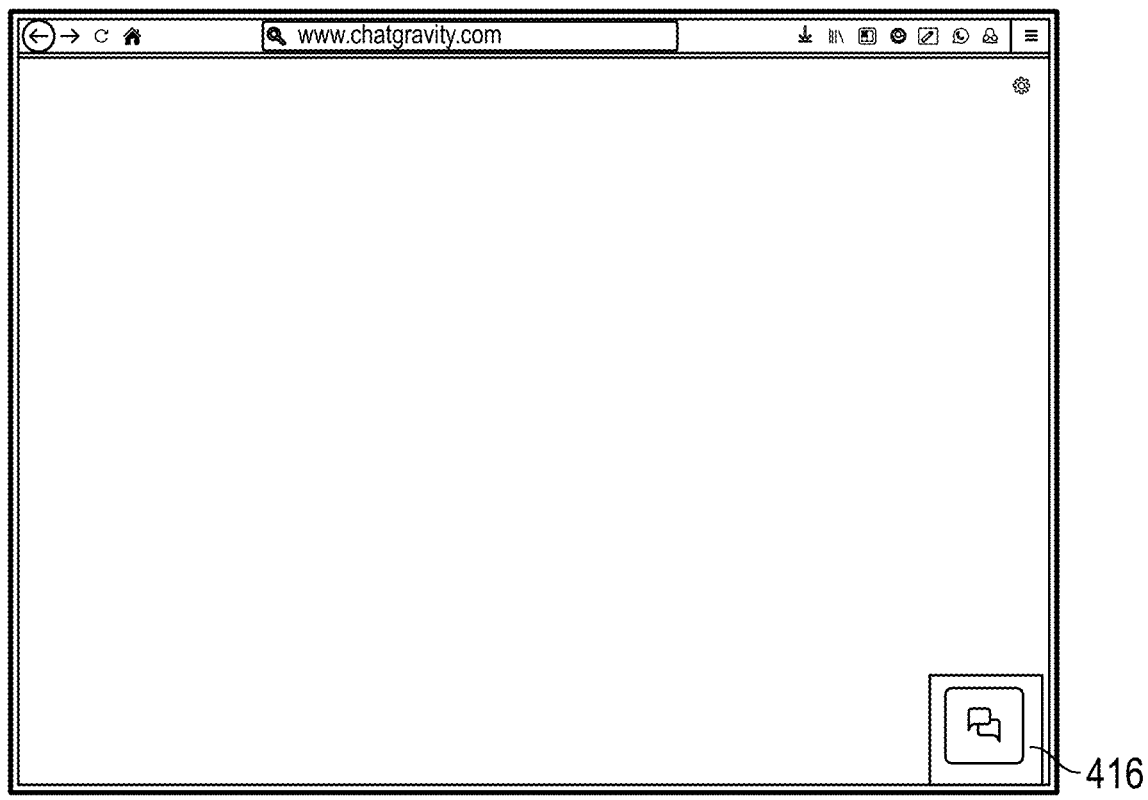
FIG. 4b shows an exemplary customer interface.
Figure 4B:
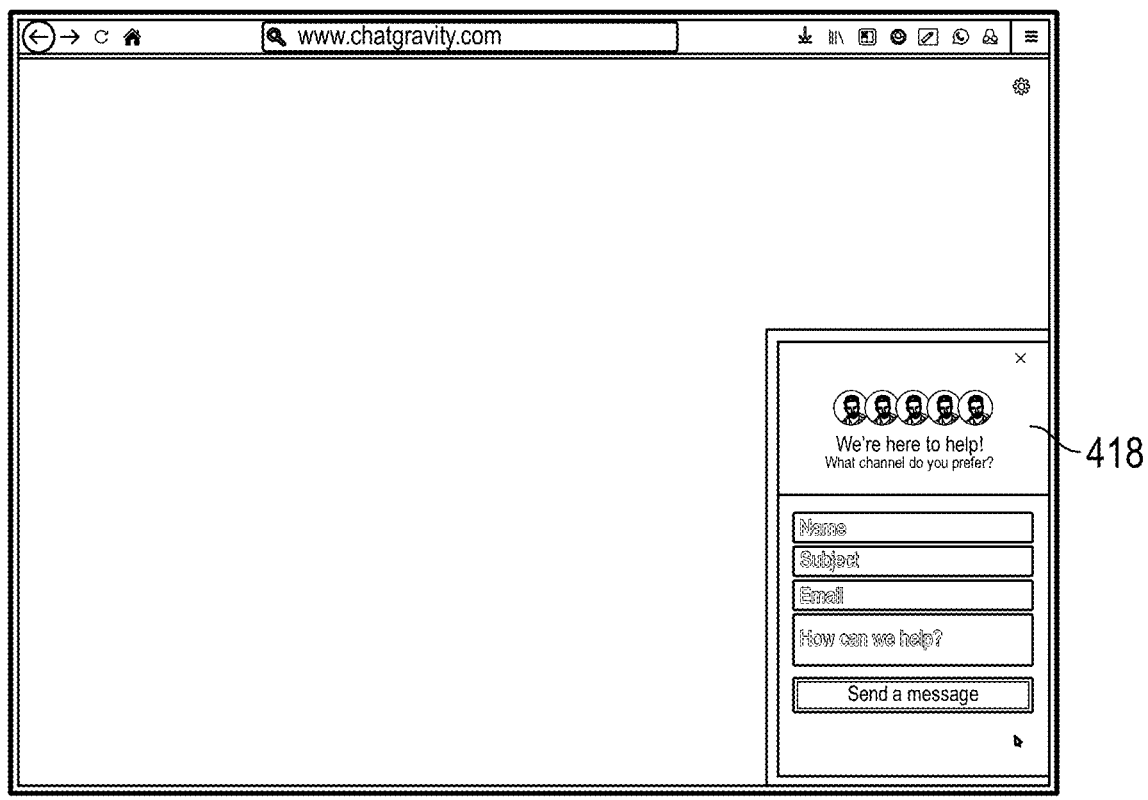

Alternatively, the email communication channel may be preselected if an operator is not available or inactive on the client sub-system. The initial prompt is configured to receive, via text input fields, the customer's name, some form of contact information such as an email address, and the customer's questions or requests 408. The answer to this initial prompt is directed to the client sub-system 410, which then displays the initial prompt answers to an active operator on the client interface or emails an inactive operator 412. The AI Operator may be activated when no human operator is active or available 414. FIG. 4b shows the chat box icon 416 and expanded chat box 418.

Figure 5:
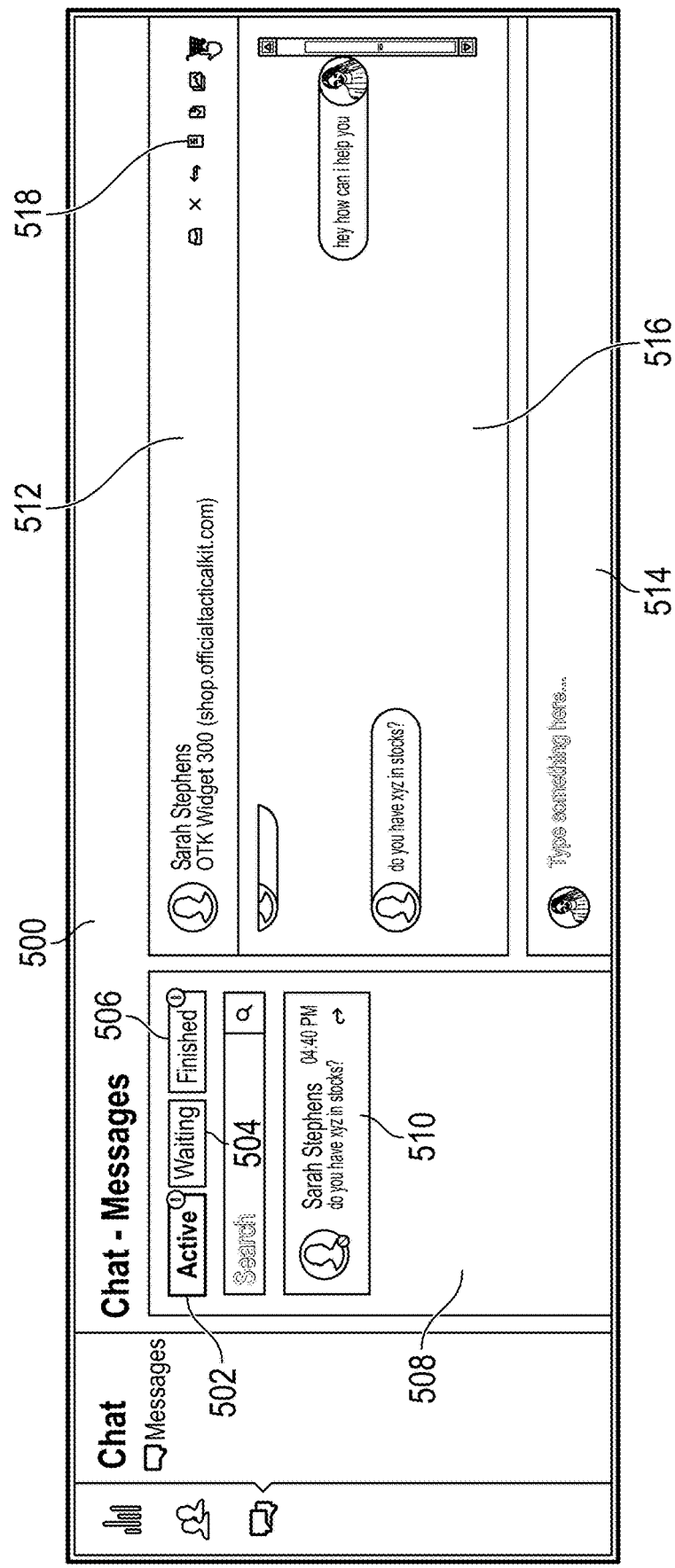
FIG. 5 shows an exemplary client sub-system interface.

As shown in FIG. 5, the client sub-system organizes relationally in a database and displays graphically on the client interface 500 communications with customers according to "active" 502, "pending" 504, and "completed" 506 categories. The active category pertains to communications with customers that are ongoing, the pending category pertains to communications which have not yet been addressed by the operator, and the completed category pertains to communications which have ended, either because the customer or client has exited the chat box on the customer interface or marked the transaction as complete, or a transaction between the customer and the customer sub-system has otherwise concluded. The communication may be considered completed after a successful credit card transaction.

If the client sub-system receives a category selection from the operator, the client sub-system will display in a first interface window 508 a list of communications 510 falling under that category. If the client sub-system then receives a communication selection from the user, the contents of that communication will be displayed in a second interface window 512. The second interface window resembles a conventional chat window in that it features a "typing" portion 514, which allows the operator to see what he or she is typing before sending to the customer, and a "typed" portion 516, which displays what the operator as well as the customer have already said in the very order in which it was said; however, the second interface window also displays a toolbox 518 of actions that the operator can perform and which relate to initiating, facilitating, and perfecting transactions.

Figure 6:
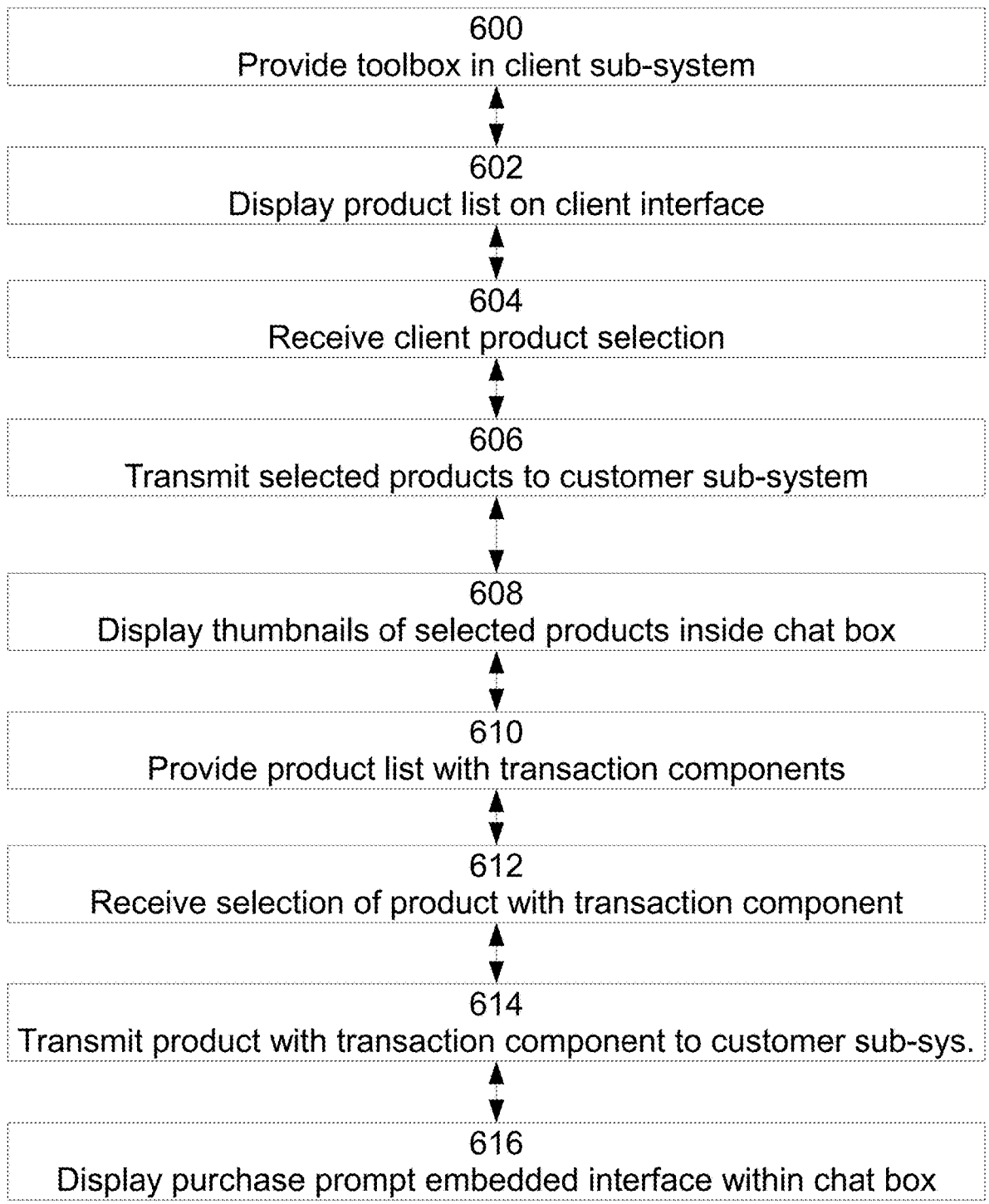
FIG. 6 shows an exemplary process of selecting products from the client sub-system interface and transmitting them to the customer sub-system interface.

As shown in FIG. 6. the toolbox provided by the client sub-system 600 includes a first list of products corresponding to the product credentials provided by the user, which are displayed when an appropriate icon is selected by the operator 602. This list enables the operator to select one or more products via "checking" or highlighting the desired product(s) 604. These selected products are then transmitted to the customer sub-system 606, which thereafter displays a thumbnail of the selected products in the chat box 608. The thumbnail may be created by pulling attributes related to a given product from a database and automatically populating them in a preselected template. Similarly, the toolbox also provides a second list of products corresponding to the first list and which include a transaction component 610. The transaction component features data and functionality relating to receiving billing and mailing address information, as well be described. Items on this second list may be similarly selected 612, the identities of which are then transmitted to the customer sub-system 614, which then displays a purchase prompt, which is an embedded interface within the borders of the chat box 616.

The thumbnail of the product from the first list may feature a checkbox which the customer may select. If the checkbox is thus selected, the purchase prompt embedded interface may be automatically displayed without the operator having to select it manually from the second list.

The purchase prompt embedded interface features all the fields necessary for receiving payment information from the customer, such as a credit card number, the billing information that associates with it, and a mailing address. The purchase prompt embedded interface may also include a thumbnail or similar representation of the products and quantity thereof which the customer is consenting to purchase. The purchase prompt embedded interface may organize the checking process by succeeding tabs, in which a first tab identifies the product, quantity, and price, the second tab receives personal information such as name and address, and the third tab receives billing information. Billing and/or personal information may be sent to the server sub-system but not displayed on the second interface window of the client interface in order to ensure that the operator, particularly a human operator, cannot see the personal or billing information, thereby ensuring the customer's privacy and financial security. However, the second interface window may display a confirmation with an order ID generated by the server sub-system, which can then be communicated by the operator to the customer, who can then request updates on the order by providing the order ID to the same or a different operator.

The AI Operator is an artificial intelligence program developed to correctly respond to customer requests as they pertain to identifying the product they wish the purchase, providing comments about the product in a manner most likely to result in a transaction, and to carry out the obtaining of information necessary to complete the transaction. The artificial intelligent program is a neural network, comprising either an CNN or RNN structure, which is trained on chat histories between customers and live operators. The training may be unsupervised, or may be supervised with hyperparameters including whether a transaction has occurred, the monetary amount of the transaction, the length the chat transpired until the transaction completed, and a rating applied to the chat based on its proximity to an "ideal". Once an AI Operator is activated on the platform, training may continue using the AI Operator's own chat history, with additional hyperparameters determined by administrators.

The AI Operator may also be trained to detect "problematic chats", which are chats that are characterized by one or more fatal flaws. Examples of flaws include if the customer shows signs of becoming belligerent, which may be detected through the use of profanity, if the customer inquires whether the AI Operator is actually a "real person", or if the customer appears to be not a real customer at all, but a bot designed to subvert chat applications. When these flaws are detected, a signal may be sent to a live operator to oversee and possibly take over the communication with the customer.

The AI Operator may be trained to recommend products to a customer based on the detection of keywords. These keywords may be set by an administrative user on the client sub-system, or preselected by the user and imported via the product lists. These keywords may have a binary correspondence with each product, such that a given keyword is either associated or not associated with a given product, or may have a prioritized rank association, such that the keyword is associated with several products but in a particular order of increasing to decreasing association, or may have a weighted rank association with each product. The AI Operator may adjust these associations based on its training with the chat histories, and thereafter rely on these associations when recommending products.

Each keyword may be accompanied by a list of faulty versions, in which the faulty version is identical to a keyword except for a spelling mistake. These faulty keywords may be included in the product lists, or generated automatically by the client sub-system and assigned a relational value with respect to the correct keyword, with the relational value depending on how "faulty" the misspelling is. In the event that the customer communicates a word matching a "faulty" keyword, the AI Operator may inquire of the customer whether the correct keyword was intended, and if the customer answers in the affirmative, the AI Operator will proceed as if the correct keyword was itself communicated. In one variation, the AI Operator is trained on words and their common misspellings in the context of various sentences.

The AI Operator may be separately trained with image recognition capabilities, permitting it to receive an image from the customer via the chat box, and determine which product(s) are most similar to the content of the image. Based on that similarity, the AI Operator may invoke the most similar product(s) from the list and transmit a thumbnail of it to the customer, confirming whether the most similar product is indeed the product desired by the customer. The AI Operator can then be additionally trained based on the customer's reply as well as whether the transaction was completed or not.

In one embodiment, the AI Operator may operate in conjunction with a human operator, with the AI Operator permitted to undertake certain kinds of actions or communications with the customer, reserving other actions or communications for the live operator. In this embodiment, the AI Operator undertakes actions automatically, but in an alternate embodiment, the AI Operator displays its action or communication in a pending state to the live operator, who can then either accept or reject the action/communication. These rejections are added to the chat history to provide additional training for the AI Operator. The AI Operator program may be stored on the server sub-system, and activated to interact on the customer and client interfaces.

In an embodiment, a transactional chat platform may be provided. The platform may include a customer sub-system and customer interface, a client sub-system and client interface, and a server sub-system and database. The sub-systems may be configured to transmit data between the customer sub-system and the client sub-system, between the client sub-system and the server sub-system, or between the customer sub-system and the server sub-system. The client sub-system may be configured to operate and display the client interface on a first computer, on a second computer, and/or a third computer.

The client sub-system may be configured to receive requests from a business user using a first set of input devices and/or a second set of input devices, with the first computer coupled to the first set of input devices and the second computer coupled to the second set of input devices. The client sub-system may be configured to receive a request via the first set of input devices to create one or more of a chat widget, a name designation attribute, a domain designation attribute, and product credential. The name and domain designation attributes may be assigned to the chat widget, the domain designation attribute identifying a client website onto which the chat widget will be operate, and the product credentials associated with a list of products available for sale on the client website.

The client sub-system may be configured to receive a request via the first set of input devices to set the aesthetic interface attribute settings for the chat widget. The client sub-system may be configured to generate embedded widget code and the customer sub-system may be configured to receive the embedded widget code. The customer sub-system may be configured to display an icon for a chat box corresponding to the chat widget on the client website, and upon receiving a selection of the chat box icon via the second set of input devices, display the chat box using the aesthetic interface attribute settings.

The client sub-system may be configured to initiate a transaction in response to customer communications via the chat box by identifying products from the product list based on keywords used by the customer. Those products may then be displayed as thumbnails in the chat box. Confirmation from the customer that the customer that such products are desired is received, and a purchase prompt embedded interface entirely within graphical boundaries of the chat box is displayed. The purchase prompt embedded interface may include billing and mailing address fields to be completed by the customer.

The client sub-system may be configured to categorize customer communications received through the chat box as active, pending, or completed. The active categorization may be applied to ongoing communications in which the customer is communicated and being responded to, the pending categorization may be applied to communications in which the customer is communicated but has not yet been responded to, and the completed categorization may be applied to communications in which the customer has completed the transaction.

The client sub-system may be configured to interface with an artificial intelligence program to enable the artificial intelligence program to communicate with customers via the chat box. In some embodiments, the artificial intelligence program may include a neural network trained using chat histories between customers and live operators of the chat box to identify customer product requests.

The training of the artificial intelligence program may be supervised via hyperparameters assigned to the chat histories, the hyperparameters including whether a given chat history records a completed transaction.

The artificial intelligence program may additionally be trained to perform image recognition processes on images of products submitted by the customers into the chat box and identify products from the product list that are similar to products recognized in the images. The program may then recommend products to customers based on the detection of keywords used by the customer. The program may be configured to undertake communications with the customer without requiring approval from a human operator. The program may be configured to share automated communications intended for the customer with the human operator, and only to transmit the communications if the human operator approves, and not to transmit the communications if they are rejected by the human operator. The program may be configured to additionally train based on the approvals and rejections of communications by the human operator.

The artificial intelligence program may be trained to detect misspellings of keywords, and upon detecting a misspelling of a given keyword, ask the customer whether the given keyword was intended.

In certain embodiments, a method of integrating purchase prompts into a chat box is provided. The method may include the step of providing a transactional chat platform comprising a set of processors configured to operate over a network.

The platform may be configured to receive requests from a business user using a first set of input devices and a customer user using a second set of input devices. The platform may be configured to receive a request via the first set of input devices to create a chat widget, a name designation attribute, a domain designation attribute, and product credentials, with the name and domain designation attributes assigned to the chat widget, the domain designation attribute identifying a client website onto which the chat widget will be operate, and the product credentials associated with a list of products available for sale on the client website.

The platform may be configured to receive a request via the first set of input devices to set the aesthetic interface attribute settings for the chat widget. The platform may be configured to generate an embedded widget code and incorporate into the client website.

The platform may be configured to display an icon for a chat box corresponding to the chat widget on the client website, and upon receiving a selection of the chat box icon via the second set of input devices, display the chat box using the aesthetic interface attribute settings.

The platform may initiate a transaction in response to customer communications via the chat box by identifying products from the product list based on keywords used by the customer user and displaying those products as thumbnails in the chat box. The platform may receive confirmation from the customer that the customer desires the products, and display a purchase prompt embedded interface entirely within graphical boundaries of the chat box. The purchase prompt may be an embedded interface including billing and mailing address fields to be completed by the customer user.

The platform may categorize customer communications received through the chat box as active, pending, or completed, with the active categorization applied to ongoing communications in which the customer user is communicated and being responded to, the pending categorization applied to communications in which the customer is communicated but has not yet been responded to, and the completed categorization applied to communications in which the customer has completed the transaction.

In some embodiments, the processors may additionally be programmed to interface with an artificial intelligence program to enable the artificial intelligence program to communicate with customers via the chat box. The artificial intelligence program may include a neural network trained using chat histories between customers and live operators of the chat box to identify customer product requests. The training may be supervised via hyperparameters assigned to the chat histories. The hyperparameters may include whether a given chat history records a completed transaction.

In certain embodiments, the artificial intelligence program may be trained to perform image recognition processes on images of products submitted by the customers into the chat box and identify products from the product list that are similar to products recognized in the images. The artificial intelligence program may be instructed to recommend products to customers based on the detection of keywords used by the customer user. The artificial intelligence program may be configured to undertake communications with the customer without requiring approval from a human operator.

The artificial intelligence program may be configured to share automated communications intended for the customer with the human operator, and only to transmit the communications if the human operator approves, and not to transmit the communications if they are rejected by the human operator.

The artificial intelligence program may additionally be configured to train based on the approvals and rejections of communications by the human operator.

The artificial intelligence program may be trained to detect misspellings of keywords, and upon detecting a misspelling of a given keyword, ask the customer whether the given keyword was intended.

While this invention has been described in conjunction with the embodiments outlined above, many alternatives, modifications and variations will be apparent to those skilled in the art upon reading the foregoing disclosure. Accordingly, the embodiments of the invention, as set forth above, are intended to be illustrative, not limiting. Various changes may be made without departing from the spirit and scope of the invention.

What is claimed is:

1. A transactional chat platform computer system comprising a processor, a computer-readable memory, a computer-readable storage device, and program instructions stored on the computer-readable storage device for execution by the processor via the computer-readable memory, the stored program instructions causing the processor to:
   a. transmit, via a customer sub-system, a client sub-system, and a server sub-system, data between the customer sub-system and the client sub-system, between the client sub-system and the server sub-system, and between the customer sub-system and the server sub-system,
      wherein the client sub-system is configured to interface with an artificial intelligence program to enable the artificial intelligence program to communicate with customers via a chat box, and
      wherein the artificial intelligence program is additionally trained to perform image recognition processes on images of products submitted by the customers into the chat box and identify products from a product list that are similar to products recognized in the images;
   b. operate and display, via the client sub-system, a client interface on a first computer, operate and display, via the customer sub-system, a customer interface on a second computer, and operate, via the server sub-system, a database on a third computer;
   c. receive requests, via the client sub-system, from a business user using a first set of input devices, receive requests, via the customer sub-system, from a customer user using a second set of input devices, wherein the first computer is coupled to the first set of input devices and the second computer is coupled to the second set of input devices;
   d. receive a request, via the client sub-system and the first set of input devices, to create a chat widget, a name designation attribute, a domain designation attribute, and product credentials, wherein the name and domain designation attributes are assigned to the chat widget, the domain designation attribute identifies a client website onto which the chat widget will operate, and the product credentials are associated with a list of products available for sale on the client website;
   e. receive a request, via the client sub-system and the first set of input devices, to set the aesthetic interface attribute settings for the chat widget;
   f. generate, via the client sub-system, embedded widget code, and receive, via the customer sub-system, the embedded widget code;
   g. display, via the customer sub-system, an icon for the chat box corresponding to the chat widget on the client website, and upon receiving a selection of the chat box icon via the second set of input devices, display the chat box using the aesthetic interface attribute settings;
   h. initiate, via the client sub-system, a transaction in response to customer communications via the chat box by identifying products from the product list based on keywords used by the customer and displaying those products as thumbnails in the chat box, receiving confirmation from the customer that the customer desires the products, and displaying a purchase prompt embedded interface entirely within graphical boundaries of the chat box, wherein the purchase prompt embedded interface comprises billing and mailing address fields to be completed by the customer;
   i. categorize, via the client sub-system, customer communications received through the chat box as active, pending, or completed, wherein the active categorization is applied to ongoing communications in which the customer is communicated and being responded to, the pending categorization is applied to communications in which the customer is communicated but has not yet been responded to, and the completed categorization is applied to communications in which the customer has completed the transaction; and j. limit, via the client sub-system, access to chat widget features based on a client payment plan,
wherein the chat widget features include a quantity of generated chat widgets, a maximum quantity limit of customers engaged with via one or more chat widgets, and the aesthetic interface attribute settings of each chat widget.

2. The transactional chat platform of claim 1, wherein the artificial intelligence program comprises a neural network trained using chat histories between customers and live operators of the chat box to identify customer product requests.

3. The transactional chat platform of claim 1, wherein the training of the artificial intelligence program is supervised via hyperparameters assigned to the chat histories, the hyperparameters including whether a given chat history records a completed transaction.

4. The transactional chat platform of claim 1, wherein the artificial intelligence program is instructed to recommend products to customers based on the detection of keywords used by the customer.

5. The transactional chat platform of claim 1, wherein the artificial intelligence program is configured to undertake communications with the customer without requiring approval from a human operator.

6. The transactional chat platform of claim 1, wherein the artificial intelligence program is configured to share automated communications intended for the customer with the human operator and only to transmit the communications if the human operator approves and not to transmit the communications if they are rejected by the human operator.

7. The transactional chat platform of claim 1, wherein the artificial intelligence program is additionally trained based on the approvals and rejections of communications by the human operator.

8. The transactional chat platform of claim 1, wherein the artificial intelligence program is trained to detect misspellings of keywords, and upon detecting a misspelling of a given keyword, ask the customer whether the given keyword was intended.

9. A method of integrating purchase prompts into a chat box, comprising the step of providing a transactional chat platform comprising a set of processors configured to operate over a network and programmed to:

a. receive requests from a business user using a first set of input devices and a customer user using a second set of input devices;

b. interface with an artificial intelligence program to enable the artificial intelligence program to communicate with customers via the chat box,
wherein the artificial intelligence program is trained to perform image recognition processes on images of products submitted by the customers into the chat box and identify products from the product list that are similar to products recognized in the images;

c. receive a request via the first set of input devices to create a chat widget, a name designation attribute, a domain designation attribute, and product credentials, with the name and domain designation attributes assigned to the chat widget, the domain designation attribute identifying a client website onto which the chat widget will be operate, and the product credentials associated with a list of products available for sale on the client website;

d. receive a request via the first set of input devices to set aesthetic interface attribute settings for the chat widget;

e. generate an embedded widget code and incorporate into the client website;

f. display an icon for a chat box corresponding to the chat widget on the client website, and upon receiving a selection of the chat box icon via the second set of input devices, display the chat box using the aesthetic interface attribute settings;

g. initiate a transaction in response to customer communications via the chat box by identifying products from the product list based on keywords used by the customer user and displaying those products as thumbnails in the chat box, receiving confirmation from the customer that the customer desires the products, and displaying a purchase prompt embedded interface entirely within graphical boundaries of the chat box, the purchase prompt embedded interface comprising billing and mailing address fields to be completed by the customer user;

h. categorize customer communications received through the chat box as active, pending, or completed, with the active categorization applied to ongoing communications in which the customer user is communicated and being responded to, the pending categorization applied to communications in which the customer is communicated but has not yet been responded to, and the completed categorization applied to communications in which the customer has completed the transaction; and i. limit access to chat widget features based on a client payment plan,
wherein the chat widget features include a quantity of generated chat widgets, a maximum quantity limit of customers engaged with via one or more chat widgets, and the aesthetic interface attribute settings of each chat widget.

10. The method of claim 9, wherein the artificial intelligence program comprises a neural network trained using chat histories between customers and live operators of the chat box to identify customer product requests, the training supervised via hyperparameters assigned to the chat histories, the hyperparameters including whether a given chat history records a completed transaction.

11. The method of claim 9, the artificial intelligence program instructed to recommend products to customers based on the detection of keywords used by the customer user.

12. The method of claim 9, the artificial intelligence program configured to undertake communications with the customer without requiring approval from a human operator.

13. The method of claim 9, the artificial intelligence program configured to share automated communications intended for the customer with the human operator and only to transmit the communications if the human operator approves and not to transmit the communications if they are rejected by the human operator.

14. The method of claim 9, the artificial intelligence program configured additionally trained based on the approvals and rejections of communications by the human operator.

15. The method of claim 9, the artificial intelligence program trained to detect misspellings of keywords, and upon detecting a misspelling of a given keyword, ask the customer whether the given keyword was intended.

16. The transactional chat platform of claim 1, wherein the stored program instructions further cause the processor to receive, via the client sub-system, a subscription request.

17. The transactional chat platform of claim 16, wherein the stored program instructions further cause the processor to confirm, via the server sub-system, the subscription request based on billing information received via the client sub-system.

* * * * *